Figure 1:
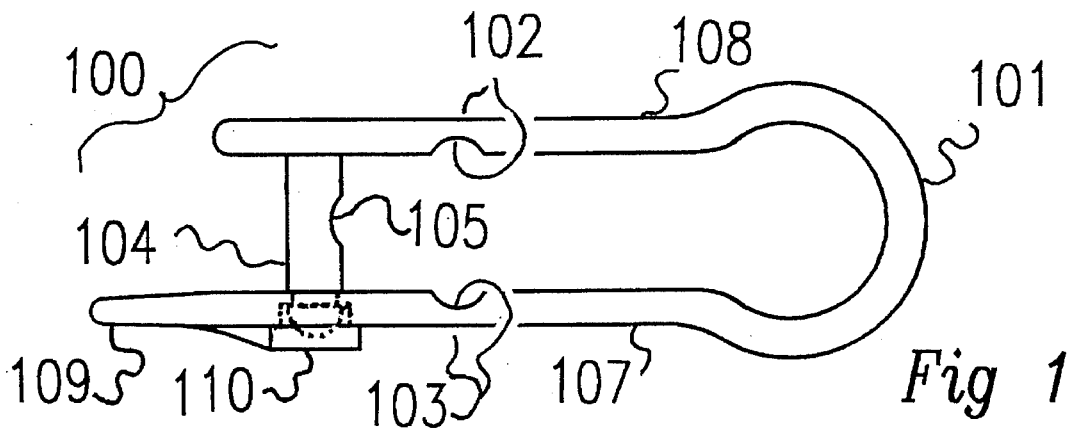

United States Patent [19]
Robinson et al.

[11] Patent Number: 5,497,537
[45] Date of Patent: Mar. 12, 1996

[54] CLIP FOR FABRIC STRUCTURES

[76] Inventors: Michael D. Robinson, School Road; Barry J. Causton, 63 Waimaukau Station Road, both of Waimaukau, Auckland, New Zealand

[21] Appl. No.: 279,883

[22] Filed: Jul. 26, 1994

[51] Int. Cl.⁶ .................................................. A47H 13/00
[52] U.S. Cl. ................. 24/716; 24/30.5 A; 24/543; 24/602; 160/330
[58] Field of Search .................. 24/3.4, 3.3, 716, 24/706.1, 543, 598.4, 602, 115 F, 461, 462, 460, 30.5 P; 160/DIG. 6, 330; 119/865; 135/89

[56] References Cited

U.S. PATENT DOCUMENTS

| | | | |
|---|---|---|---|
| 272,772 | 2/1883 | Rieger | 24/716 |
| 1,118,782 | 11/1914 | Koski et al. | 24/598.4 |
| 3,300,827 | 1/1967 | Hutton | 160/330 |
| 4,226,589 | 10/1980 | Klein | 24/602 |
| 4,441,233 | 4/1984 | Swift | 24/30.5 P |
| 5,027,477 | 7/1991 | Seron | 24/598.4 |
| 5,111,867 | 5/1992 | Horton et al. | 160/330 |
| 5,244,135 | 9/1993 | Nelson | 24/602 |
| 5,339,884 | 8/1994 | Angerman | 160/DIG. 6 |
| 5,351,739 | 10/1994 | Levy | 160/DIG. 6 |

*Primary Examiner*—Victor N. Sakran
*Attorney, Agent, or Firm*—Young & Thompson

[57] ABSTRACT

A frangible clip which gives way at a loading less than the limits of supporting structures is used in bulk to secure panels of porous cloth to supporting cables. The porous cloth is that used in agriculture for shade, wind, rain, hail, or snow protection of plants or animals. The clips are installed to form loops which slide along support cables and which pass through the structure of the cloth and around a preferred soft-sheathed hem cable which strengthens all edges of the cloth. A panel of porous cloth may be held stretched out by anchoring hem cables at a first corner, passed around anchored pulleys at each adjacent corner, and tensioning them onto an anchor at the far corner. The anchors may be attached to the support cables or to poles or ground structures. These improvements are useful in minimising storm damage.

7 Claims, 2 Drawing Sheets

CLIP FOR FABRIC STRUCTURES

FIELD

This invention relates to an improved procedure for securing fabrics, used generally as protection for crops or animals in agricultural applications, to supporting cords or cables.

BACKGROUND

In various agricultural procedures it is common to modify an environment locally using structures which at least partially wall off some crop or animal from adverse effects such as sunshine, rain, hail, snow, or wind. In many cases the wall may conveniently be made of a usually porous fabric (that is, including apertures passing through the fabric) rather than a solid construction, as a suitably supported porous fabric provides sufficient modification of the adverse effect under consideration without introducing other adverse effects—such as total shading. For example, a windbreak may be made of an unrolled porous fabric supported like a fence between substantially vertical posts to windward of the objects to be protected. Alternatively perimeter walls and an overhead canopy of a more porous fabric may be provided over the entire area to be protected.

Porous fabrics constructed from the preferred polyethylene, polypropylene or polyester yarns are flexible, extensible, and liable to abrade. They are preferably given resistance to ultraviolet light. Such fabrics are usually supplied in rolls of a specified width and typically 330 or 660 feet (100 or 200 meters) in length, have selvedged edges, and are of indefinite length. They also have minimal shear strength in the plane of the fabric which results in minimal transfer of load—which may be imposed by the wind or a build-up of snow or hail—from an attachment point to adjacent yarns not directly attached. Most constructions support the loaded fabric with linkages between the selvedges of the fabric and the usual steel supporting cables under tension arranged to run parallel to and alongside the strips of fabric.

To effectively build a durable, reliable and economical structure using these fabrics, it is desirable to be able to hold them in a way that shares and transfers the load between the maximum number of yarns and each attachment point (clips, in this invention) which are linked via external support cables under significant tension to support members. At the same time, the system should be easy to install in the field.

Preferred arrangements for the spatial positioning and support of the cables are as follows:

(a) Canopy Structures

Supporting structures of perhaps 20 years ago were usually based on timber frames which the fabrics were battened to with timber battens. Although this structure is still used, it is generally recognised as too expensive, and often, as too weak to withstand wind, snow, ice and hail loads.

The preferred support structure is now more usually constructed from a series of parallel cables supporting the selvedge of fabric panels; crossed at approximately 90 degrees with a second set of generally parallel cables to fix the spacing of the first set and to (optionally) reduce the deflections of the fabric under load perpendicular to the plane of the fabric. A third set parallel to the first set may also be used as a mid-span support for the fabric panels. The cable grid is supported vertically by generally upright poles fixed to either or both sets of cables. At their ends (and also at intermediate points for extensive structures) the cables are fixed to an anchor assembly usually comprising a pole (or poles) and a tie to a ground anchor.

(b) Fence Structures

The support structure may be a line or lines of cantilevered poles with wires or cables between, or two or more near right-angled grids of cables vertically spaced with poles at some or all of the grid node points providing vertical support and maintaining the vertical separation between the grids.

In each case the fabric is attached to some or all of the cables or wires, and to some or all of the poles.

Current Attachment Methods for Porous Fabrics

The intention is to collect the tension in the fabric into the reinforced selvedge over a distance and transfer it to the parallel support cable. The distance depends on the structural efficiency of the reinforcing, and the structural characteristics of the transfer clip.

Example Selvedge Reinforcing Systems

(a) Eyelets and Wire

Steel wires threaded in and out eyelets provided in the fabric have been used in Australia and New Zealand. This has provided sufficient strength, but has had problems, such as the fabric slipping down the wire, leading to bunching at one end of the structure after a storm, and sandy or salty environments causing degradation of the wire (even if galvanised) in turn leading to early abrasion failure of the fabric.

(b) Sewn Hems and Wire

In this version, the fabric has been hemmed on-site onto steel wires. Problems with sewing variability in particular have led to this system being largely discontinued. Instead hems are sewn in a factory, and rope drawcords are provided at the time of manufacture to allow a wire to be pulled into the hem as the rope is pulled out.

(c) Tape and Grommet

In this system the cloth selvedge is reinforced by sewing on a strip or strips of webbing. Grommets are then punched into the reinforced area at intervals of typically 150 mm to 600 mm depending on the expected load.

(d) Tape Tension-Bands

The tape in the tape and grommet system is sewn along the selvedge and thus parallel to the edge of the cloth. An alternative is to sew the tape in a catenary shape spanning perhaps 10 m and running from the selvedge to a point approximately 1 m in from the selvedge, then back to the selvedge. The tape is then firmly anchored every 10 m and the selvedge only lightly anchored along its length.

Connecting the Reinforced Selvedge to the Parallel Support Cable

(a) "S" Hooks

These are most commonly used with the tape and grommet system. They are relatively rigid, and have a tendency to fall out on the down-wind side of the fabric.

(b) Snap Fit "D" Shackles

These shackles are made from a variety of plastic type materials, but most commonly a nylon such as Nylon 11. They were originally developed for use as running shackles for light-weight yachting ropes.

(c) "Butterfly" Clamps

These have been designed to clamp a small section of selvedge (normally unreinforced).

Shortcomings of the Existing Technology

In the process of investigating failed porous fabric structures in New Zealand, Australia and the Pacific Islands, and particularly after Hurricane Andrew in Florida, it has been observed that:

1. The fabric has a tendency to slide along the hem cable if one is used.
2. Fabric left on structures during extreme winds can cause the entire structure to be destroyed, thus dramatically extending the time until a replacement can be erected and production of the crop protected by the structure resumed.
3. The gusty nature of winds create high impact loads which can lead to premature failure of the more rigid systems. Fatigue failure may also be a factor in such situations.
4. Tape and grommet systems, and butterfly clamps do not adequately transfer the load between the fabric and the support cable in that they fail at a small fraction of the intrinsic strength of the fabric.
5. Tape tension-band systems are too flexible leading to flapping cloth and an increase in impact loads and cloth abrasion/fatigue problems.

In addition, when constructing porous fabric structures it has been observed that the cost of erection is dramatically reduced if on-site fabrication steps are avoided as far as possible, as the remote nature of many sites and the problems of erecting fabric in a wind both cut productive time and thereby add to the expense of an installation.

There is evidently a special and as yet only partially satisfied requirement for suitable attachments at the interface between the selvedges of a length of fabric and the tensed steel cables running parallel to them. Existing attachments have been observed to be insufficient in a functional sense and also relatively difficult to install.

OBJECT OF INVENTION

It is an object of this invention to provide the public with a useful choice by way of an improved connection system for supporting (porous) protective fabrics.

STATEMENT OF INVENTION

In a first aspect this invention comprises a clip for attaching a sheet of material at an edge to a supporting rod or cable; the clip being made of a resilient material and comprising a throat region between two arms, a base, and an open end which may be closed permanently by the passage of a deformable head on a projection from one arm through an aperture in the other arm, characterised in that the arms include weakened portions having a controlled strength.

Preferably the strength of the weakened portions of either arm is sufficient to maintain integrity up to about from 1 to 2 kN of force at 70 degrees F. and 70% relative humidity.

More preferably the strength of the weakened portions of either arm is sufficient to maintain integrity up to about 1.3 kN of force at 70 degrees F. and 70% relative humidity.

Alternatively the strength is about 15 to 30% of the breaking strain of a strengthened edge of the sheet of material.

In a related aspect the clip preferably indicates by a visual sign that it has been severely loaded yet remained intact.

Preferably the visual sign includes (a) visually evident stretching of the clip at the weakened sites, and/or (b) crazing or whitening of the surface.

Preferably the weakened portions are created by reducing the cross-section of the clip at those places.

In a further related aspect the clip provides a safety mechanism to protect the underlying supporting structure in the event of severe loadings, when the clip gives way and releases the sheet of material.

In another main aspect the invention comprises an attachment clip having an arrow-head as a hole-creator, with a ledge on the end of the projection, to make the clip easier to push through a porous agricultural cloth and to stop it falling out as the cloth is lifted into position.

In a further main aspect the invention comprises a method for unfurling and holding in place a sheet of cloth, comprising the steps of attaching a series of clips in a longitudinally slidable linkage over a support cable along each long side of the cloth, and through the hem of the cloth and around a hem cable, and stringing the hem cable as two pans from an anchor point at one end of the cloth along adjacent edges of the cloth, and around pulleys to converge at a second diametrically opposite anchor point, and maintaining the hem cable under tension so that the cloth is substantially maintained in a plane.

In a related aspect the invention provides a single point where hem cable tension in a panel may be altered so as to change the tension applied to the fabric of that panel.

DRAWINGS

The following is a description of a preferred form of the invention, given by way of example only with reference to the accompanying diagrams.

FIG. 1: is an illustration of a fabric clip according to the present invention.

Figure 2:
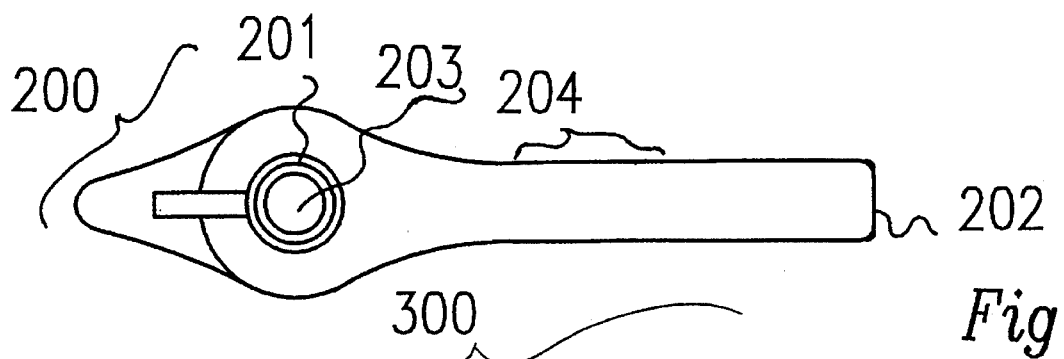

FIG. 2: is another illustration of a fabric clip according to the present invention.

Figure 3:
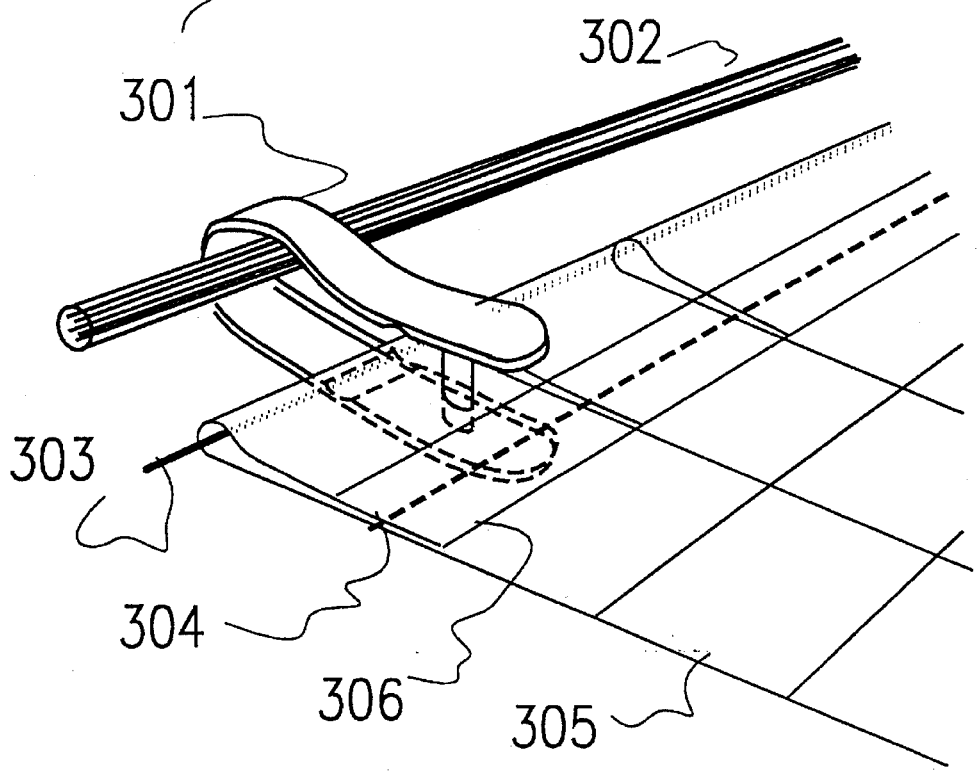

FIG. 3: illustrates application of the fabric clip to a suspended sheet of fabric.

Figure 4:
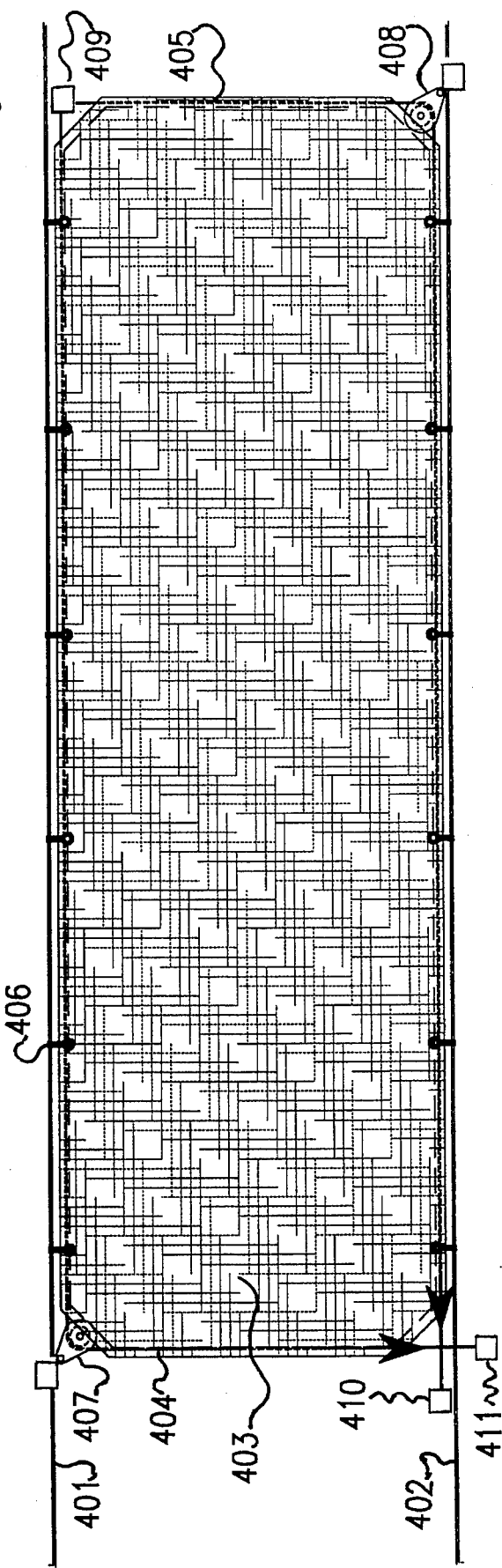

FIG. 4: is an illustration of a method for supporting and tensioning a protective shield made of a porous fabric including a hem cable.

Figure 5:
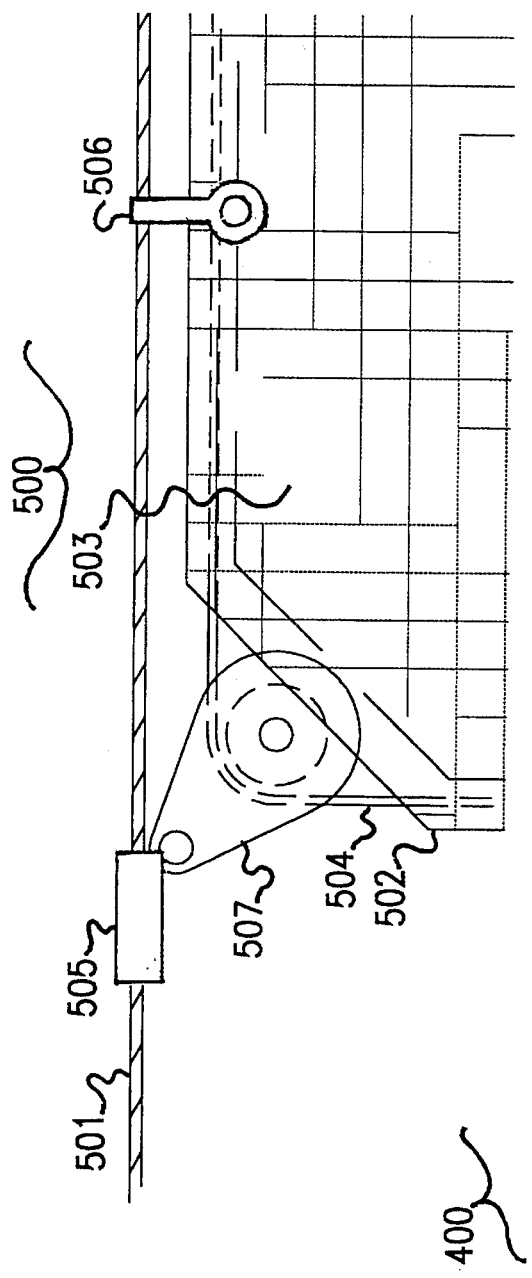

FIG. 5: is an illustration of portions of the fabric support system of FIG. 4.

PREFERRED EMBODIMENT

In order to attain our objective of spreading out the tension in the fabric as it passes into the reinforced selvedge and eventually to a supporting cable, we have developed a novel clip which can be placed over the support cable and through the porous material at the time of installation.

This clip overcomes problems associated with corroding wires in that it is the clip, not the fabric that makes contact with the wire. The clip is shown in FIGS. 1 and 2. It may be made of any of a variety of environmentally resistant plastic type materials, capable of being bent, but most commonly one would select a nylon such as Nylon 11 or Nylon 6.

100 shows a view along the axis of a U-shaped closed clip. 101 is the base and 107 and 108 are the limbs. The limbs are held closed (after application) by a cross-arm 104 and a snap-fit catch comprised of a head with a reduced neck passed through an aperture 110. The arm 104, and more particularly the limbs 107 and 108 are provided with sections of reduced diameter at 102, 103, and 105. Past stresses at these points which are deliberately weakened by being made narrower so that the force per unit area is raised, will be visually detectable after a storm even if the clip does not break, as a "telltale" which appear as a whitened or crazed area. Thus this clip is a frangible clip. The arrowhead or point 109 is a tool—used to create a hole through an open weave fabric or porous cloth large enough to easily admit the cross-arm. The ledge 110 helps to hold the clip in place in the cloth during the installation process.

One method of installation, resulting in an arrangement 300 for supporting a fabric 305 from a support cable 302 as shown in FIG. 3, comprises the steps of taking an open clip, making an aperture through the cloth at a selected position using the point 109, placing its base around a supporting cable 302, passing the cross arm through an aperture in a fabric selvedge 304 (or forcibly making one if one is not apparent) and deforming the cross arm head and the aperture so that the head passes through the aperture and is locked in place as for the clip 301. A preferred method for installation is to push the head of the cross-arm through the cloth, then lift the clip over the cable, initiating support, and finally to squeeze the clip shut. Alternative methods exist; for example if the initial hole is made large enough the body of the clip can be passed through it before it is closed over any cables. A pair of pliers adapted to fit over the clip from the base would provide a useful mechanical advantage. The ledge on the cross-arm makes the clip easier to push through the cloth and retain it as the cloth is lifted into position. Note that the clip shown in FIG. 3 does not include the optional point and ledge.

Some cloths may be used with hem cables, some use eyelets through which a cable can be passed, and some can use both methods for hem cable attachment. For the second type the head of the clip would again be preferably passed through the textile so as to include the hem cable within the loop. If the cloth has been fabricated with a hem cable 303 of some type (preferably of high-tensile steel, coated with a soft plastics material) (or means to attach one at installation), sewn within the hem or selvedge of the fabric to act as a tension-carrying member or a load-spreader, the head of the clip would preferably be passed through the textile so as to include the hem cable within the loop.

It will be appreciated that this operation can be carried out in a reasonably windy environment and that "trimming" of a structure can be accomplished by installing further clips as and where necessary. We expect that clips would typically be placed 500 to 1500 mm (2 to 6 feet) apart, though this depends substantially on the calculated tension in the fabric under design winds and other loads.

During use, a steel cable under tension would pass through the part-circular profile at the base of the clip, perpendicular to the plane of the drawing, and the cross-arm 104 would be passed through the supported fabric at or near a selvedge.

200 shows the face view of a similar clip. 202 is the base, 203 is the head of the cross arm (cf 104) and 201 points towards an aperture through which the head has been passed.

The weakened zones are preferably provided with a tensile stress at failure time of 1.3 kN at 70 deg F. and 70% relative humidity. This value is selected as being about 15% to 30% of the ultimate strength of the hem cable. The clip has a reliable strength under static and dynamic loads, although we are aware that the strength of nylon varies by about 50% as a result of environmental temperature and humidity fluctuations. As many plastics exhibit resilience and at higher loadings, "creep" before actual failure, clips according to this design will dampen impact loads, tending to protect both the selvedge and the fabric.

For different applications, more or less clips per unit length may be used so that one rating of clip can serve in a number of applications. An advantage of these weakened zones is that the stress may be selected so as to let the fabric go under a sufficiently high wind, preferably before the accumulated loading exceeds the integrity of the supporting structure, and optionally so that the fabric itself is not unduly fragmented. If the supporting poles, cables, etc. remain in place it is quicker to restore the canopy to its original state by simply attaching (preferably with our clips) a new length of fabric to the substantially undamaged pole structure.

We are able to use these clips, which resemble curtain hooks able to slide along the support cables 302, 401,402 in a scheme to maintain a given panel of fabric in an expanded configuration. FIGS. 4 and 5 illustrate a method for rigging a panel of a porous cloth in any attitude; horizontal, vertical, or sloping, so that it can be stretched out. FIG. 4 shows at 400 a panel of a porous cloth which may for example be 30 to 100 feet in length and 5–60 feet across. It is supported between a pair of cables 401,402 under tension and is held in a defined place by anchor points shown as squares—such as 505, 409 and 410. The fabric 403 of the panel is provided with a hem cable which can be regarded as being in two sections 404 and 405, joined at the anchor point 409 though they may in fact be a single cable. Section 404 passes through the top and the left side of the panel as drawn, and terminates at an anchor point 411; optionally through a tension spring. Section 405 passes down the right side along the hem at the bottom of the illustration, terminating in anchor point 410. Each cable passes around a pulley; 407 or 409. FIG. 5 shows at 500, detail of pulley 407. This pulley is anchored at 505 (perhaps a swaged or crimped collar over the support cable 501 or alternatively tied to a pole or other rigid point) and the hem cable 504 emerges from the hem 502 of the cloth 503, passes around the pulley, and continues towards the other anchor point. The anchor points may be a support pole, but may be points along the support cables, either the main cable or a transverse cable.

FIGS. 4 and 5 also illustrate the clips of this invention in a somewhat stylised form, at 406 and 506. A preferred spacing is at about 1.5 meters or 4 to 5 feet.

ALTERNATIVES

The clip could be manufactured as discrete clips, or in a continuous length which may be used as a continuous length, or cut.

Other applications for the clips include scaffolding shrouds or windshields, as used to (a) trap flying debris from the building and (b) to reduce wind within the site, or to attach canvas to canopies—preferably of the permanent or semi-permanent kind.

Finally, it will be appreciated that various alterations and modifications may be made to the foregoing without departing from the scope of this invention as set forth.

We claim:

1. A clip for attaching a sheet of material along an edge to an elongated supporting member; the clip being made of a resilient material and comprising a throat region between two arms, a base, and an open end which closes permanently by the passage of a deformable head on a projection from one arm through an aperture in the other arm, the arms including deliberately weakened portions having a controlled strength, said weakened portions having a structure such as to give a visual sign that it has been severely loaded yet remains intact.

2. A clip as claimed in claim 1 wherein the weakened portion is weakened by being provided with a reduced cross-sectional area.

3. A clip as claimed in claim 1 in which the strength of the weakened portion of either arm is sufficient to maintain integrity up to about from 1 to 2 KN of force at 70 degrees F. and 70% relative humidity.

4. A clip as claimed in claim 3 in which the strength of the weakened portion of either arm is sufficient to maintain integrity up to about 1.3 KN of force at 70 degrees F. and 70% relative humidity.

5. A clip as claimed in claim 1 in which the strength of the weakened portion of either arm is sufficient to maintain integrity up to about one quarter of the breaking strain of the reinforced edge of the sheet of material.

6. A clip as claimed in claim 5 which provides a safety mechanism to protect the underlying supporting structure in the event of severe loadings, when the clip gives way and releases the sheet of material.

7. A clip as claimed in claim 1 additionally having a point constructed at the end of one arm, comprising a tool to aid in making an aperture through a porous agricultural cloth.

\* \* \* \* \*